(12) United States Patent
Tsang (10) Patent No.: US 11,303,080 B2
(45) Date of Patent: Apr. 12, 2022

(54) ELECTRICAL SOCKET EXTENDER

(71) Applicant: INTELLECTUAL PRODUCTS LIMITED, Clacton on Sea (GB)

(72) Inventor: Michael Tsang, Clacton on Sea (GB)

(73) Assignee: INTELLECTUAL PRODUCTS LIMITED, Clacton on Sea (GB)

(*) Notice: Subject to any disclaimer, the term of this patent is extended or adjusted under 35 U.S.C. 154(b) by 40 days.

(21) Appl. No.: 16/963,954

(22) PCT Filed: Feb. 22, 2019

(86) PCT No.: PCT/GB2019/050498
§ 371 (c)(1),
(2) Date: Jul. 22, 2020

(87) PCT Pub. No.: WO2019/162691
PCT Pub. Date: Aug. 29, 2019

(65) Prior Publication Data
US 2021/0050695 A1 Feb. 18, 2021

(30) Foreign Application Priority Data

Feb. 22, 2018 (GB) .................................. 1802910

(51) Int. Cl.
| | |
|---|---|
| *H01R 31/02* | (2006.01) |
| *H01R 27/00* | (2006.01) |
| *H01R 31/06* | (2006.01) |
| *H02G 3/04* | (2006.01) |
| *H02G 11/00* | (2006.01) |
| *H01R 13/73* | (2006.01) |

(52) U.S. Cl.
CPC ............. *H01R 31/02* (2013.01); *H01R 27/00* (2013.01); *H01R 31/06* (2013.01); *H02G 3/0406* (2013.01); *H02G 11/00* (2013.01); *H01R 13/73* (2013.01)

(58) Field of Classification Search
CPC ........ H01R 31/06; H01R 31/02; H01R 13/73; H01R 27/00; H02G 3/0406; H02G 3/02; H02G 3/00; H02G 11/00
USPC ......................................................... 439/536
See application file for complete search history.

(56) References Cited

U.S. PATENT DOCUMENTS

| | | | | |
|---|---|---|---|---|
| 4,245,873 A | * | 1/1981 | Markowitz | .......... H01R 25/003 439/32 |
| 4,553,798 A | | 11/1985 | Murphy | |
| 4,875,871 A | * | 10/1989 | Booty, Sr. | ............ H01R 25/162 439/209 |

(Continued)

FOREIGN PATENT DOCUMENTS

DE 2448041 A1 4/1976

*Primary Examiner* — Harshad C Patel
(74) *Attorney, Agent, or Firm* — Renner, Kenner, Greive, Bobak, Taylor & Weber (57) ABSTRACT

The present invention relates to an electrical socket extender to provide an electrical socket remote from a surface/wall-mounted electrical socket. In particular, the present invention relates to an electrical socket extender to provide an electrical socket remote from a surface/wall-mounted electrical socket, the socket extender comprising: a socket engaging portion connectable to the wall-mounted electrical socket; an appliance socket section providing one or more electrical appliance socket; and a linkage which connects the appliance socket section to the socket engaging portion.

19 Claims, 10 Drawing Sheets

(56) References Cited

U.S. PATENT DOCUMENTS

| | | | | |
|---|---|---|---|---|
| 5,306,165 A * | 4/1994 | Nadeau | H01R 25/14 | |
| | | | 439/115 | |
| 5,885,109 A * | 3/1999 | Lee | H01R 31/06 | |
| | | | 439/652 | |
| 5,895,275 A * | 4/1999 | Harbertson | H01R 25/003 | |
| | | | 439/21 | |
| 6,004,138 A | 12/1999 | Harbertson | | |
| 6,077,086 A * | 6/2000 | LaRoche | H01R 25/006 | |
| | | | 439/173 | |
| 6,488,511 B1 * | 12/2002 | Stewart | B25F 5/021 | |
| | | | 30/296.1 | |
| 6,755,676 B2 * | 6/2004 | Milan | H01R 25/003 | |
| | | | 439/214 | |
| 7,004,786 B1 * | 2/2006 | Bloom | H01R 13/72 | |
| | | | 439/142 | |
| 7,163,409 B1 * | 1/2007 | Chen | H01R 25/006 | |
| | | | 439/131 | |
| 7,465,178 B2 * | 12/2008 | Byrne | H01R 25/162 | |
| | | | 439/215 | |
| 7,544,100 B2 * | 6/2009 | Teitelbaum | H01R 24/22 | |
| | | | 439/652 | |
| 7,722,380 B1 * | 5/2010 | West | H01R 13/6395 | |
| | | | 439/373 | |
| 7,874,856 B1 * | 1/2011 | Schriefer | H01R 13/514 | |
| | | | 439/214 | |
| 8,723,055 B2 * | 5/2014 | Beldock | A47B 9/14 | |
| | | | 174/494 | |
| 9,124,044 B2 * | 9/2015 | Beldock | H01R 25/006 | |
| 10,003,159 B2 * | 6/2018 | Dickey | H02G 11/00 | |
| 10,205,283 B2 * | 2/2019 | Dickey | H01R 13/447 | |
| 10,263,373 B2 * | 4/2019 | Byrne | H01R 24/30 | |
| 10,283,952 B2 * | 5/2019 | Dombrowski | H02G 3/34 | |
| 10,468,860 B2 * | 11/2019 | Byrne | H01R 13/5219 | |
| 2005/0176281 A1 | 8/2005 | Zhuge | | |
| 2008/0280470 A1 * | 11/2008 | Byrne | H01R 31/06 | |
| | | | 439/215 | |
| 2011/0197794 A1 * | 8/2011 | Nunes | H02G 11/02 | |
| | | | 108/50.02 | |
| 2016/0268728 A1 * | 9/2016 | Zantout | G06F 1/20 | |
| 2017/0346244 A1 * | 11/2017 | Comis | H01R 24/68 | |

* cited by examiner

ELECTRICAL SOCKET EXTENDER

FIELD OF THE INVENTION

The present invention relates to an electrical socket extender to provide an electrical socket remote from a wall-mounted electrical socket.

BACKGROUND OF THE INVENTION

Wall-mounted electrical sockets are often pre-installed in domestic and commercial premises in order to provide sources of electricity for the occupants of those premises and their appliances. Unfortunately, the locations in which these electrical sockets are provided may not always be convenient, especially due to the positioning of furniture or equipment close to a wall on which the wall-mounted electrical socket is located. Furthermore, persons with physical impairments, such as those who are injured, disabled (e.g. wheelchair bound) or who have declining health, may well find it difficult to reach these wall-mounted electrical sockets, especially if a socket is located particularly low or high on a wall, or behind a piece of furniture. The problem is compounded by the fact that rewiring wall-mounted electrical sockets in order to relocate them is a manually intensive and expensive task, which involves considerable work being carried out on one or more walls of the premises, something which may not be permitted in certain circumstances, for instance should the premises be rented, or be a listed building.

Extension cords, having a male plug for insertion into an electrical socket, one or more female appliance outlets and an insulated cable connecting the plug to the one or more outlet are often used to extend the reach of such wall-mounted electrical sockets. These devices, though quite versatile, present a number of issues. For example, the cable can create a tripping hazard or may be chewed or tampered with by children and small animals, and the devices are also often visually unappealing, especially where there is sagging or coiled cabling. Furthermore, though the appliance outlet may have means for mounting to a wall, mounting the appliance outlet in such a way is rarely a suitable option for a user, due to unsightliness and issues with carrying out work on the walls. A further concern is that even if a user chooses to mount an extension cord to a wall, during subsequent use and reordering of the contents of the premises, the new location of the outlet may itself become inconvenient. If the user is to remedy the problem, they then need to choose a new fixed location, perform the necessary work on the wall to provide a new mounting and probably also fix the damage caused by the initial mounting of the appliance outlet to the wall.

The present invention thus aims to provide a means by which a user can quickly, securely and simply create an electrical outlet, connected to, but remote from, a wall-mounted electrical socket, without damaging substantially the wall adjacent to the socket. The present invention also aims to provide a collapsible socket extender which allows improved portability and storage. The present invention allows a user quickly and easily to extend the reach of a surface/wall-mounted electrical socket in order to create an electrical socket in a more convenient location. This electrical socket can thus allow the user greater flexibility in how they organise the contents of a room and also makes reaching the electrical outlet much less demanding.

SUMMARY OF THE INVENTION

According to the present invention there is provided an electrical socket extender to provide an electrical socket remote from a wall-mounted electrical socket, the socket extender comprising:
  a socket engaging portion connectable to the wall-mounted electrical socket and comprising:
    a non-conductive housing having at least one electrically conductive prong for insertion into a female recess of the wall-mounted electrical socket to electrically couple thereto; and
    one or more secure primary coupling formation formed about a periphery of the socket engaging portion such that, when the socket engaging portion is engaged with a wall-mounted electrical socket one or more of the or each primary coupling formation may releasably connect to a linkage to form an electrical connection therewith;
  an appliance socket section providing one or more electrical appliance socket and comprising:
    a body having at least one electrically conductive recess formed therein, the recess allowing insertion of an electrically conductive prong of an electrical appliance plug; and
    one or more secure secondary coupling formation formed about a periphery of the appliance socket section, one or more of the or each secondary coupling formation releasably connectable to the linkage and the or each secondary coupling formation having an electrical connection, interior to the body, to electrically-couple the linkage to the electrical appliance socket; and
  a linkage, which connects the appliance socket section to the socket engaging portion, comprising:
    an elongate and electrically insulated body having a first end releasably connectable to any primary coupling formation, a second end connectable to any secondary coupling formation; and
    a conducting arrangement extending the length of the body, between the first end and the second end to electrically couple the socket engaging portion to the appliance socket section,
  wherein the first end of the linkage is connected, or integrated, to the socket engaging portion and the second end of the linkage is connected, or integrated, to the appliance socket section such that the linkage extends from the socket engaging portion over the wall.

According to the present invention there is also provided an electrical socket extender to provide an electrical socket remote from a surface/wall-mounted electrical socket, the socket extender comprising:
  a socket engaging portion connectable to the wall-mounted electrical socket and comprising:
    a non-conductive housing having at least one electrically conductive prong for insertion into a female recess of the wall-mounted electrical socket to electrically couple thereto; and
    two or more secure primary coupling formations formed about a periphery of the socket engaging portion such that, when the socket engaging portion is engaged with a wall-mounted electrical socket each primary coupling formation may releasably connect to a linkage to form an electrical connection therewith;
  an appliance socket section providing one or more electrical appliance socket and comprising:

a body having at least one electrically conductive recess formed therein, the recess allowing insertion of an electrically conductive prong of an electrical appliance plug; and two or more secure secondary coupling formations formed about a periphery of the appliance socket section, each secondary coupling formation releasably connectable to the linkage and each secondary coupling formation having an electrical connection, interior to the body, to electrically-couple the linkage to the electrical appliance socket; and a linkage, which connects the appliance socket section to the socket engaging portion, comprising:

a substantially rigid, elongate and electrically insulated body having a first end releasably connectable to any of the primary coupling formations, a second end connectable to any of the secondary coupling formations; and a conducting arrangement extending the length of the body, between the first end and the second end to electrically couple the socket engaging portion to the appliance socket section, wherein the first end of the linkage is connected, or integrated, to the socket engaging portion and the second end of the linkage is connected, or integrated, to the appliance socket section such that the linkage extends from the socket engaging portion over the wall/surface and the appliance socket section is supported in its position remote from the wall-mounted electrical socket by the linkage.

The provision of one or more secure primary coupling formations formed about a periphery of the socket engaging portion, and one or more secure secondary coupling formations formed about a periphery of the appliance socket section, permit the electrical socket extender to be assembled in various configurations, for instance, dependent upon the needs of the user and/or the space limitations of the premises where the electrical socket extender is being used. Each configuration may allow the extender to reach from the wall-mounted electrical socket in a different direction adjacent the wall. The specific locations of the primary coupling formations about the periphery of the socket engaging portion may help to determine in which direction the linkage can extend from the socket engaging portion, when the linkage is connected to one of the primary couplings. The linkage may be integrated to one of the primary couplings.

Four primary coupling formations may be provided and disposed such that a connected or integrated linkage can extend generally upward towards the ceiling, downward towards the floor, or in either direction horizontally along the wall. An arrangement such as this should cover most of the orientations that an average user would require of such an electrical socket extender, in order to usefully relocate an electrical socket, adjacent a wall. A plurality of linkages and appliance socket sections may be provided with the electrical socket extender. One, or each, primary coupling formation of a single socket engaging portion may connect with a separate linkage. Each linkage may be connected, or integrated, to a separate appliance socket section, such that multiple appliance socket sections are provided remote from, but connected to, the single socket engaging portion and wall-mounted electrical socket. Where a plurality of linkages and appliance socket sections are provided, these may be connected or integrated in a modular fashion such that each appliance socket section may connect to and support one or more further linkages and appliance socket sections.

Primary coupling formations and/or secondary coupling formations which are not connected, or integrated, to the linkage may have covers to prevent tampering. This is especially useful as a safety mechanism, as it helps to avoid children tampering with the socket extender, and potentially receiving hazardous electric shocks. The covers of the primary and/or secondary coupling formations may comprise any suitable means, for instance bungs, inserts or shutters. The primary coupling formations may comprise isolating means to prevent a primary coupling formation from conducting electricity unless a linkage is connected or integrated therewith. The secondary coupling formations may comprise isolating means to prevent a secondary coupling formation from conducting electricity unless a linkage is connected or integrated therewith. The coupling formations may be covered in such a way that only by introduction of a linkage to the coupling formation is a cover thereof unlocked or moved to prevent accidental access.

The socket engaging portion may comprise disconnecting means to aid in disconnecting the socket engaging portion from the wall-mounted electrical socket. The disconnecting means may be stowed when not required, to prevent the disconnecting means from becoming a nuisance during assembly, disassembly or use of the electrical socket extender, and to enhance the aesthetic appeal of the electrical socket extender. The disconnecting means may comprise a handle. They may be stowed by a folding and/or sliding motion.

The socket engaging portion may further comprise one or more electrical appliance socket. This has the advantages of increasing the number of electrical appliance sockets and leaving one available at the original location of the socket. The socket engaging portion may comprise one or more features commonly found on wall-mounted electrical sockets, such as USB charging ports, electrical isolation means (which may comprise one or more ON/OFF switch) and indicator lights to indicate whether the socket engaging portion and/or any of the secure primary coupling formations are conducting electricity.

The appliance socket section may comprise one or more similar feature, such as USB charging porta, ON/OFF switch and indicator lights.

The electrical socket extender may comprise a timer to control the supply of electricity to any connected appliances. The timer may limit the supply of electricity to certain times of the day and/or may only supply electricity for a specific length of time after the timer is activated, the specific length of time which may be pre-set by a user.

Preferably, the linkage is extendable. The advantage of an extendable linkage is to allow alteration of the effective range of the socket extender to suit requirements. The extension of the linkage may be achieved by including various suitable means. Preferably, the linkage is also retractable so that it may lengthened and shortened.

Preferably, the linkage comprises a telescopic arrangement to permit adjustment thereof. The telescopic arrangement is a particularly compact means of providing linear contraction and/or extension of the linkage and may permit a wide range of positions. The telescopic arrangement may have at least 2 telescopic linkage sections. The telescopic arrangement can also allow the linkage to be light-weight yet strong when appropriately constructed, for instance by using an appropriate material and/or by modifying the linkage structure. The telescopic arrangement may comprise two or more telescopic linkage sections which slide relative to one another.

The telescopic sections may have a variety of shapes and may be variously configured to allow extension.

The telescopic sections may be stacked upon one another and extend by the sliding of adjacent telescopic sections. The telescopic sections may be disposed concentrically of one another and extend by the sliding of internal sections relative to external sections. The telescopic sections may have a substantially constant cross-sectional shape along a portion, or the majority, of each telescopic section. The cross-section(s) of the linkage may be circular, square, rectangular or oval, though various other shapes are within the scope of the application.

One or more of the telescopic sections may include a stop, which can limit the extension of one telescopic section relative to a connected telescopic section or sections adjacent thereto. Stops may be particularly useful to prevent the telescopic arrangement from coming apart by over extension.

As an alternative to, or in combination with, a telescopic arrangement, the linkage may comprise a folding structure which permits extension of the linkage as relatively movable parts of the folding structure unfold. The folding structure may comprise folding members which fold or pivot relative to one another in order to extend, retract, and/or bend sideways as it will be described below.

Preferably, the telescopic arrangement comprises a releasable locking means to secure the telescopic arrangement at a desired position along a range of linear extended positions. A releasable locking means ensures that the linkage and appliance socket section may be supported stably in a desired extended position. There may be multiple releasable locking means, each acting between adjacent sections of the telescopic arrangement.

The releasable locking means may comprise any suitable mechanism, for instance, one or more clamp, a twist and locking means between adjacent telescopic sections, or a frictional fit between adjacent telescopic sections. A suitable mechanism for the releasable locking means may comprise a snap-lock configuration. A snap-lock configuration may be such that an interior telescopic section comprises a depressible locking formation which is spring-biased to project from the exterior surface of an interior telescopic section, the locking formation which may be depressible into the surface of the interior telescopic section until the projection is at least flush with the surface of the interior telescopic section.

An exterior telescopic section which slides telescopically relative to an interior section may have one or more opening formed along its surface. The opening or openings may be larger than the locking formation, so that the locking formation may spring up through an opening, when an opening slides into position directly above the locking formation (as the telescopic sections move relative to one another), thus securing the interior telescopic section to the exterior telescopic section. Where an exterior telescopic section comprises more than one opening, these may be equally spaced along the length of an exterior section, thus permitting the telescopic arrangement to be securable at a plurality of discrete, regular and secure locking positions.

The locking means may be selectively disengaged by a release mechanism to enable the linkage to be further extended or retracted. The release mechanism may be remote from the locking means. The release mechanism might allow simultaneous release and engagement of all locking means to enable rapid retraction, or further extension, of the linkage.

Preferably, the linkage comprises at least one joint either formed along the length of the linkage between sub-sections thereof and/or at either end of the linkage. Inclusion of at least one joint may allow the linkage to change direction/orientation.

Preferably, the elongate and electrically insulated body is or includes one or more resiliently deformable members, more preferably one or more accordion or concertina joints/members, either formed along the length of the linkage between sub-sections thereof or at either end of the linkage. The accordion/concertina joints/members may be designed to extend in length to some degree. The linkage may be formed as a single accordion/concertina member. The linkage may comprise two or more articulated sub-sections that are linked by one or more joint that may be an accordion/concertina joint(s). The sub-sections may be substantially rigid and have a fixed length. However, the sub-sections may be adjustable in length, for example, by using telescopic arrangements as described above. Advantageously, the accordion/concertina joints allow the linkage or the sub-sections of the linkage to flex in various directions, including bend sideways, relative to each other, enabling the socket extender to be collapsible or reconfigurable. It will be readily appreciated that this arrangement allows improved flexibility, portability and storage.

As an alternative to, or in combination with the above arrangement, the at least one joint may form a hinge mechanism that may comprise adjustable securing means to ensure that the linkage and/or appliance socket section are supported stably in a desired angled position. Such securing means may comprise any suitable pivot hinge fixing position mechanism. Potentially, it could hinge away from the wall and establish an appliance socket section lying away from the plane of the wall on which the built-in socket is formed, yet with the appliance socket section still supported in this remote position. The advantage of a joint formed along the length of the linkage between sub-sections thereof and/or at either end of the linkage is evident in that it affords greater flexibility in terms of how the appliance socket section is positionable. The at least one joint may permit sub-sections of the linkage to hinge in various planes, dependent upon the configuration of the at least one joint relative to the linkage. For example, a joint may allow a sub-section to hinge within the vertical plane created by the wall, or hinge within a second vertical plane lying perpendicular to the plane of the wall, or a horizontal plane perpendicular to both the plane of the wall and the second vertical plane, or any other suitable plane.

Where the linkage comprises more than one joint, then the subsections of the linkage may enable the socket extender to traverse changes in the wall or obstacles located on or adjacent the wall and thus ensure that the appliance socket section may ultimately lie against the wall, if necessary. For example, it may be the case that the wall-mounted electrical socket is located in a skirting board located at the base of the wall, the skirting board projecting a small distance from the wall. In this scenario, a user may wish to use the socket extender to form an electrical socket directly above the wall-mounted electrical socket but with the socket extender lying against the wall. The provision of at least two joints, configured appropriately, could thus permit the linkage to hinge about the top of the skirting board so that the appliance socket section lies against the wall, as required.

The linkage may comprise at least one joint stabiliser, selectively engageable to control articulation of the at least one joint. A joint stabiliser is advantageous in ensuring that sub-sections of the linkage may be secured in a desired hinged position relative to one another. This can be especially useful where the imposed moment upon a joint increases, for instance as the linkage is further extended and/or one or more appliance plug are inserted into the appliance socket section. The joint stabiliser may be any effective mechanism, for instance a lock within the joint to lock the joint in a given position, a tight frictional fit between portions of the joint, or a bracing support positioned between sub-sections of a linkage adjacent a joint in order to reduce the load on the joint and instead distribute the weight of the electrical socket extender between sub-sections of the linkage.

Preferably, the linkage comprises at least one swivel formed along the length of the linkage or at either end of the linkage. The swivel may allow the linkage or a sub-section thereof to swivel relative to the general axis of extension of the linkage. A swivel is useful since in permits more variation in how the electrical socket extender can be orientated, to match the demands of the user and/or environment in which the electrical socket extender is being used. The linkage may comprise at least one swivel lock to prevent movement of parts relative to the at least one swivel.

The appliance socket section may comprise a handle for movement of the appliance socket section relative to the socket engaging portion. The handle may be electrically insulated. The handle, when grasped and manipulated by a user, may allow the user to more easily guide the electrical socket extender into a desired position. Preferably, the handle is movable between a use position and a storage position. The handle may slide or hinge from the use position to the storage position. The appliance socket section may further comprise a recess into which the handle is storable. The handle may be removably attached to the appliance socket section. Where the handle is removably attachable to the appliance socket section, the handle may be attachable to the appliance socket section at a plurality of separate locations, for instance to allow more convenient relocation of the appliance socket section and/or so as not to interfere generally with usage of the electrical socket extender.

Preferably, two or more linkages may be connected to one another. This can extend the reach of the electrical socket extender and/or change the direction/orientation it extends.

The linkage and/or appliance socket section may comprise connecting means to fix the linkage and/or appliance socket section to the wall/surface. Connecting means may be especially useful since, in certain circumstances, the total weight of the socket extender may be greater than can be easily supported by the connection of the socket engaging portion to the wall-mounted electrical socket. These circumstances could be where multiple linkages are connected in series, or a network of linkages and appliance socket sections extend in a modular arrangement from the wall-mounted electrical socket, all of which can become relatively heavy. Another situation may arise where the electrical socket extender must support the weight of many appliance plugs (and perhaps also the cabling associated with each appliance plug) which are plugged into one or more appliance socket section of the electrical socket extender.

The connecting means may be non-damaging and thus may be configured to prevent superficial and/or invasive damage, to the wall. Such non-damaging connecting means may comprise any suitable arrangement, for instance one or more sucker or removable, marking or non-marking adhesives and/or securing mechanisms including but not limited to Velcro® pads/strips or magnetic means. As an alternative the connecting means may comprise any suitable arrangement, for instance threaded screws, nails, or non-removable adhesives.

Preferably, the appliance socket section is attached to a docking plate that is secured to a wall to support the appliance socket section in a suitable position remote from the wall-mounted electrical socket. The appliance socket station may be conveniently clipped onto the docking plate by clipping means or other connecting means. For safety reasons, the docking plate is preferably fixed permanently to the wall, but other suitable connecting may be used.

The linkage and/or appliance socket section may comprise means for securing loose cables of electrical appliance plugs. Provision of such means may reduce tripping or catching hazards that could otherwise result from hanging or trailing cables, and the means for securing loose wires may also enhance the aesthetics of the electrical socket extender when in use. The means for securing loose cables of electrical appliance plugs may comprise any suitable arrangement, for instance a hook over which the cables may be draped or looped.

Preferably, the socket engaging portion is interchangeable with differently configured socket engaging portions to accommodate wall-mounted electrical sockets of different configurations and the appliance socket section may be independently interchangeable to accommodate electrical appliance plugs of differing number or configuration. Interchangeable socket engaging portions may be particularly useful, for instance, where the configuration of the electrical socket differs, such as internationally, and so the socket engaging portion may be interchanged for a socket engaging portion which matches the differing configuration. By providing interchangeable socket engaging portions, a user may bring their appliances with them overseas to be used with the electrical socket extender. Similarly, an independently interchangeable appliance socket section, as mentioned above, may be useful in international territories where a user seeks to use foreign appliance plugs with the electrical socket extender.

A part of the socket engaging portion, including the at least one electrically conductive prong, may be interchangeable to accommodate wall-mounted electrical sockets of different configurations. A part of the appliance socket section, including the at least one electrically conductive recess, may be interchangeable to accommodate electrical appliance plugs of differing number or configuration. This interchangeability confers the same and further advantages as those associated with the interchangeability of the appliance socket section and/or socket engaging portion, as mentioned above.

Preferably, the housing (of the socket engaging portion) is formed by a cover element and a plug element having conducting prongs, the plug element being connected to the cover. The plug element is preferably a conventional electric plug. For clarity, existing conventional electric plug may be considered as interchangeable parts, as described above. The cover may comprise one or more pieces which are pre-assembled, or integrated with, a conventional electric plug element, preferably wherein the one or more pieces are secured to the plug by clipping means. The cover may comprise a handle, as described above. The cover could be designed such that the handle couples electrically the socket engaging portion with the linkage.

An electrical socket extender as that described above may be provided in kit form, the kit including a plurality of interchangeable socket engaging portions to connect to wall-mounted electrical sockets of differing configuration and/or may comprise a plurality of independently interchangeable appliance socket sections to accommodate electrical appliance plugs of differing number or configuration. The kit may alternatively comprise a socket engaging portion with a plurality of interchangeable parts to accommodate wall-mounted electrical sockets of different configurations and/or the appliance socket section with a plurality of interchangeable parts to accept electrical appliance plugs of differing configuration. Kits such as those outlined above may be especially useful to a user who travels frequently to various countries, and who may want to pack only the elements of the kit required for that particular country or countries. The kit may comprise a cover element and a plug element having conducting prongs, the plug element being connected to the cover to form a housing of the socket engaging portion.

An electrical socket extender as that described above may be provided in an assembled form wherein the socket engaging portion, the appliance socket section, and the linkage may be integrated in a single unit.

BRIEF DESCRIPTION OF THE DRAWINGS

In order that it be better understood, but by way of example only, the present invention will now be described with reference to the accompanying drawings in which.

In the drawings, like parts are denoted by like reference numerals.

DETAILED DESCRIPTION

Figure 1:
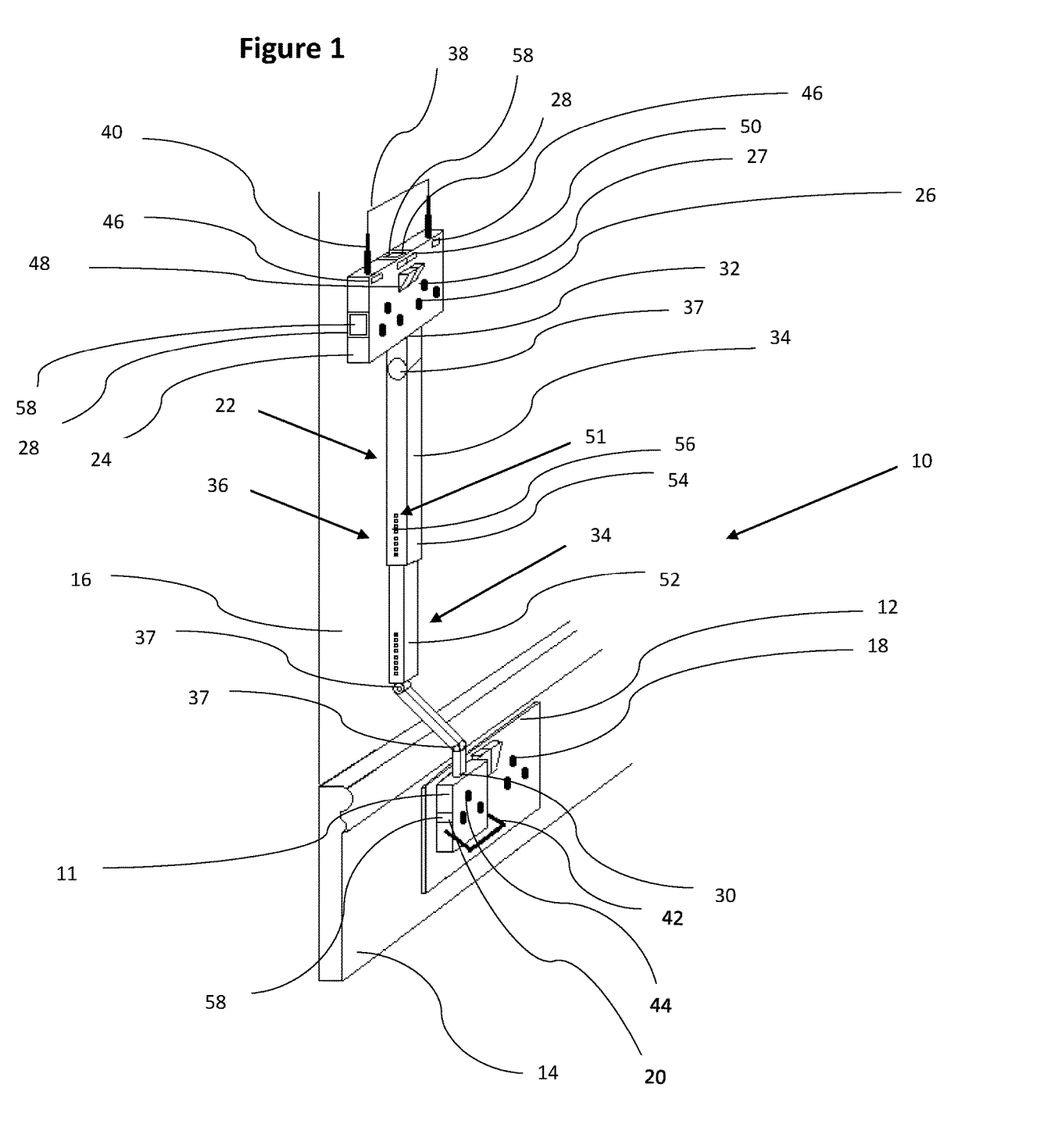
FIG. 1 is a perspective view of a first embodiment of an electrical socket extender connected to a wall-mounted electrical socket.

FIG. 1 shows a perspective view of an electrical socket extender, generally indicated 10, in accordance with the present invention. The electrical socket extender 10 has a socket engaging portion 11 which is connected to a wall-mounted electrical socket 12 mounted in this view upon a skirting board 14, located at the base of a wall/surface 16. The socket extender 10 is shown extending vertically up the wall 16. The socket engaging portion 11 comprises a non-conductive housing having at least one electrically conductive prong (not shown) that inserts into a female recess 18 of the wall-mounted electrical socket 12 to electrically couple thereto. The socket engaging portion 11 further comprises four secure primary coupling formations 20 (not all of which are visible) formed about a periphery of the socket engaging portion 11 such that, when the socket engaging portion 11 is engaged with a wall-mounted electrical socket 12 each primary coupling formation 20 may releasably connect to a linkage, generally indicated 22, to form an electrical connection therewith. The electrical socket extender 10 further comprises an appliance socket section 24 providing two electrical appliance sockets 26. The appliance socket section 24 comprises a body having at least one electrically conductive recess 27 formed therein, the recess 27 allowing insertion of an electrically conductive prong of an electrical appliance plug.

The appliance socket section 24 further comprises four secure secondary coupling formations 28 formed about a periphery of the appliance socket section 24, though only two are visible, each secondary coupling formation 28 releasably connectable to the linkage 22 and each secondary coupling formation 28 having an electrical connection, interior of the body (and therefore not shown), to electrically-couple the linkage 22 to the two electrical appliance sockets 26.

The electrical socket extender 10 further comprises the linkage 22, which connects the appliance socket section 24 to the socket engaging portion 11. The linkage 22 comprises, in this embodiment, a substantially rigid, elongate and electrically insulated body having a first end 30 releasably connectable to any of the primary coupling formations 20, and a second end 32 connectable to any of the secondary coupling formations 28. The linkage 22 also comprises a conducting arrangement extending the length of the body (internal to the linkage 22 and thus not shown), between the first end 30 and the second end 32 to electrically couple the socket engaging portion 11 to the appliance socket section 24.

In use, when the first end of the linkage 30 is connected, or integrated, to the socket engaging portion 11 and the second end of the linkage 32 is connected, or integrated, to the appliance socket section 24 the linkage 22 extends from the socket engaging portion 11 over the wall 16 and the appliance socket section 24 is supported in its position remote from the wall-mounted electrical socket 12 by the linkage 22. In this embodiment, the linkage 22 linkage is linearly extendable and comprises a telescopic arrangement, generally indicated 34, to permit extension thereof. The telescopic arrangement 34 further comprises releasable locking means, generally indicated 36, to secure the relatively moveable parts of the telescopic arrangement 34 at various positions along a range of linear extended positions. The telescopic arrangement 34 also comprises three joints 37 formed along the length of the linkage 22 between sub-sections thereof. In this embodiment, the three joints 37, are formed as hinges 37, and these hinges 37 permit the sub-sections of the linkage 22 to hinge relative to each other. This allows it to be adjusted around the skirting board 14 so that the appliance socket section 24 is disposed in a recessed position (relative to the skirting board 14) and lying against the wall 16. In this way, the socket extender 10 forms an electrical socket generally above the wall-mounted electrical socket 12 but with the socket extender 10 lying against the wall 16 to save space.

The appliance socket section 24 further comprises a handle 38 for assisting movement of the appliance socket section 24 relative to the socket engaging portion 11. The handle 38 is movable between a use position (as shown) and a storage position. The handle 38 comprises a plurality of telescopic members 40 attached to the appliance socket section 24 and the telescopic members 40 of the handle 38 may be extended to the use position and collapsed to move to the storage position. Similarly, the socket engaging portion 11 comprises disconnecting means 42 to aid in disengaging the socket engaging portion 11 from the wall-mounted electrical socket 12 and in this embodiment the disconnecting means 42 takes the form of a foldable handle 42. The socket engaging portion 11 further comprises an electrical appliance socket 44.

The appliance socket section 24 further comprises features commonly found on wall-mounted electrical sockets, and this embodiment also includes two USB charging ports 46, ON/OFF switches 48 and operational indicator lights 50.

The releasable locking means 36 of the linkage 22 further comprises a snap-lock configuration, generally indicated 51, which is configured such that an interior telescopic section 52 comprises a depressible locking formation (hidden in FIG. 1 but visible in FIGS. 7-9b as 106) which is spring-biased to project from the exterior surface of the interior telescopic section 52. An exterior telescopic section 54 which telescopes around the interior section 52 has several openings 56 formed along its surface, the openings 56 being large enough to accommodate the locking formation. The locking formation springs up under action of the spring, through an opening 56, when an opening 56 slides into position directly above the locking formation, thus securing the telescopic sections. The sections of the linkage 22 are generally hollow and square in cross-section.

Primary coupling formations 20, and secondary coupling formations 28, which are not connected, or integrated, to the linkage 22 are covered by moveable shutters 58 in order to prevent tampering.

Figure 2:
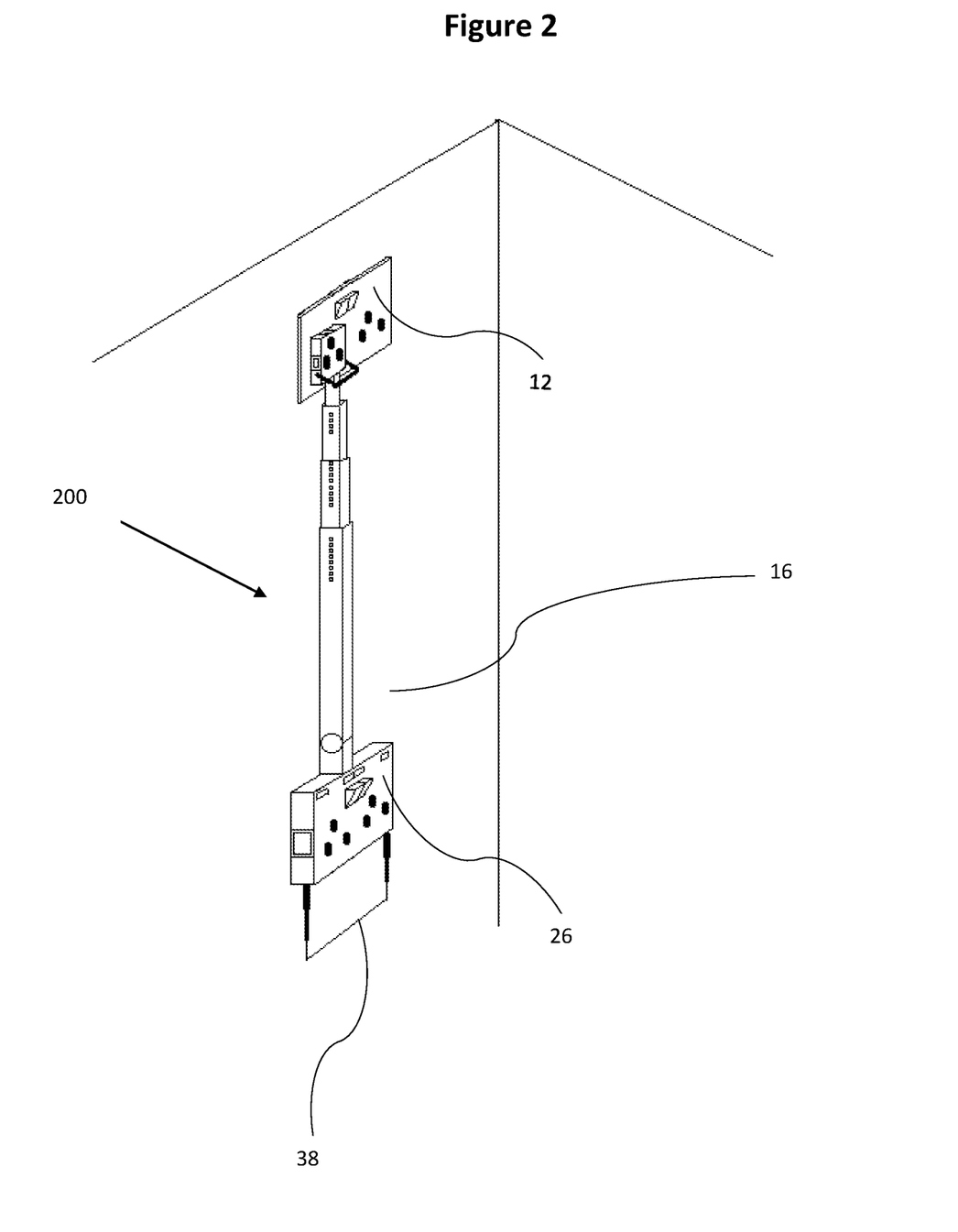
FIG. 2 is a perspective view of a second embodiment of an electrical socket extender connected to a wall-mounted electrical socket mounted near the top of a wall.

FIG. 2 shows a perspective view of a second embodiment of an electrical socket extender 200 in accordance with the present invention, here connected to a wall-mounted electrical socket 12 mounted near the top of a wall 16, close to the ceiling, the socket extender 200 extending vertically down the wall. Grasping of the handle 38 may help a user to extend the linkage of the electrical socket extender 200, to position the appliance socket section 24 in a convenient location for use.

Figure 3:
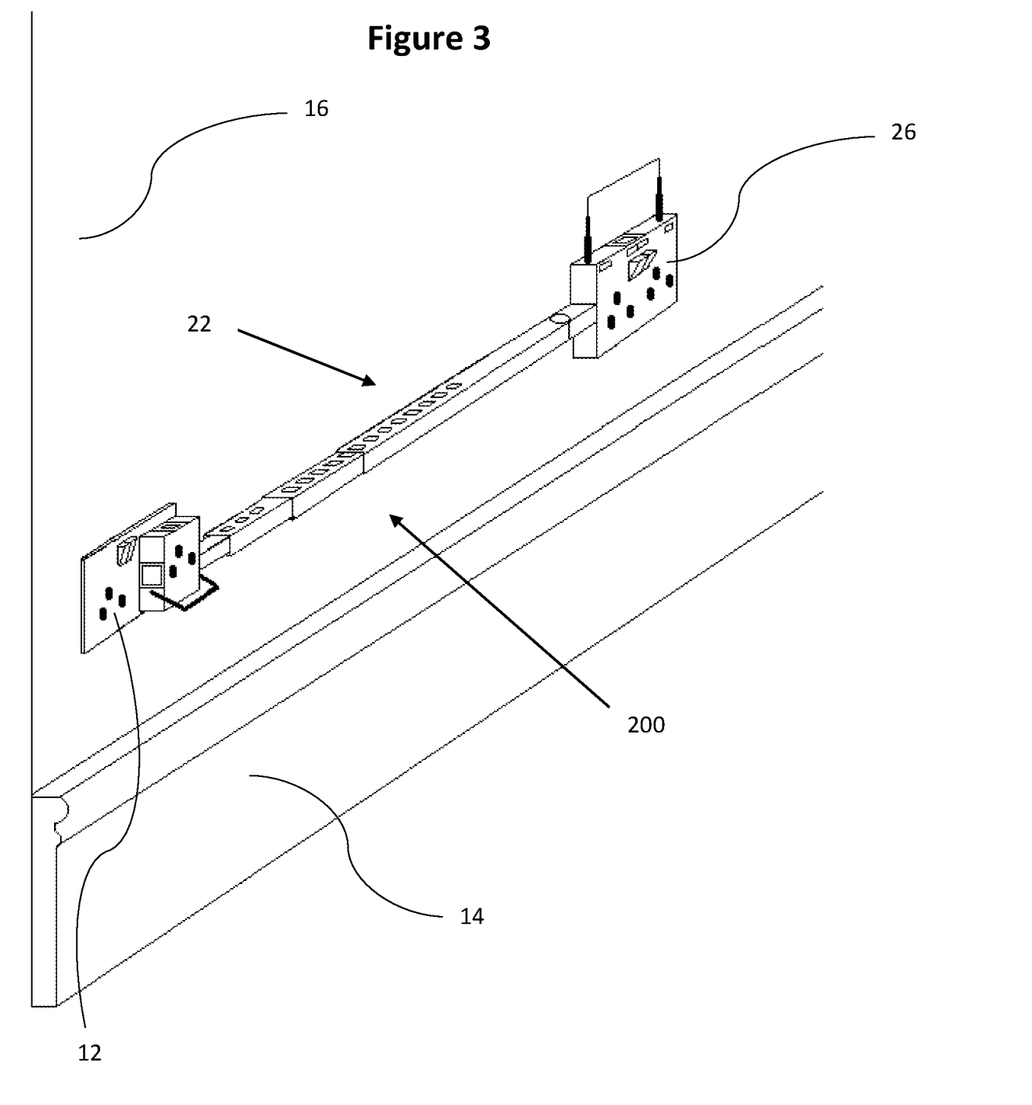
FIG. 3 is a perspective view of the electrical socket extender of FIG. 2, here connected to a wall and extending horizontally along the wall.

FIG. 3 shows a perspective view of the electrical socket extender 200 of FIG. 2, here connected to a wall-mounted electrical socket 12 mounted near the floor, above a skirting board 14, the socket extender 200 extending horizontally along the wall 16, with the appliance socket section 24 supported in its position remote from the wall-mounted electrical socket 12 by the linkage 22.

Figure 4:
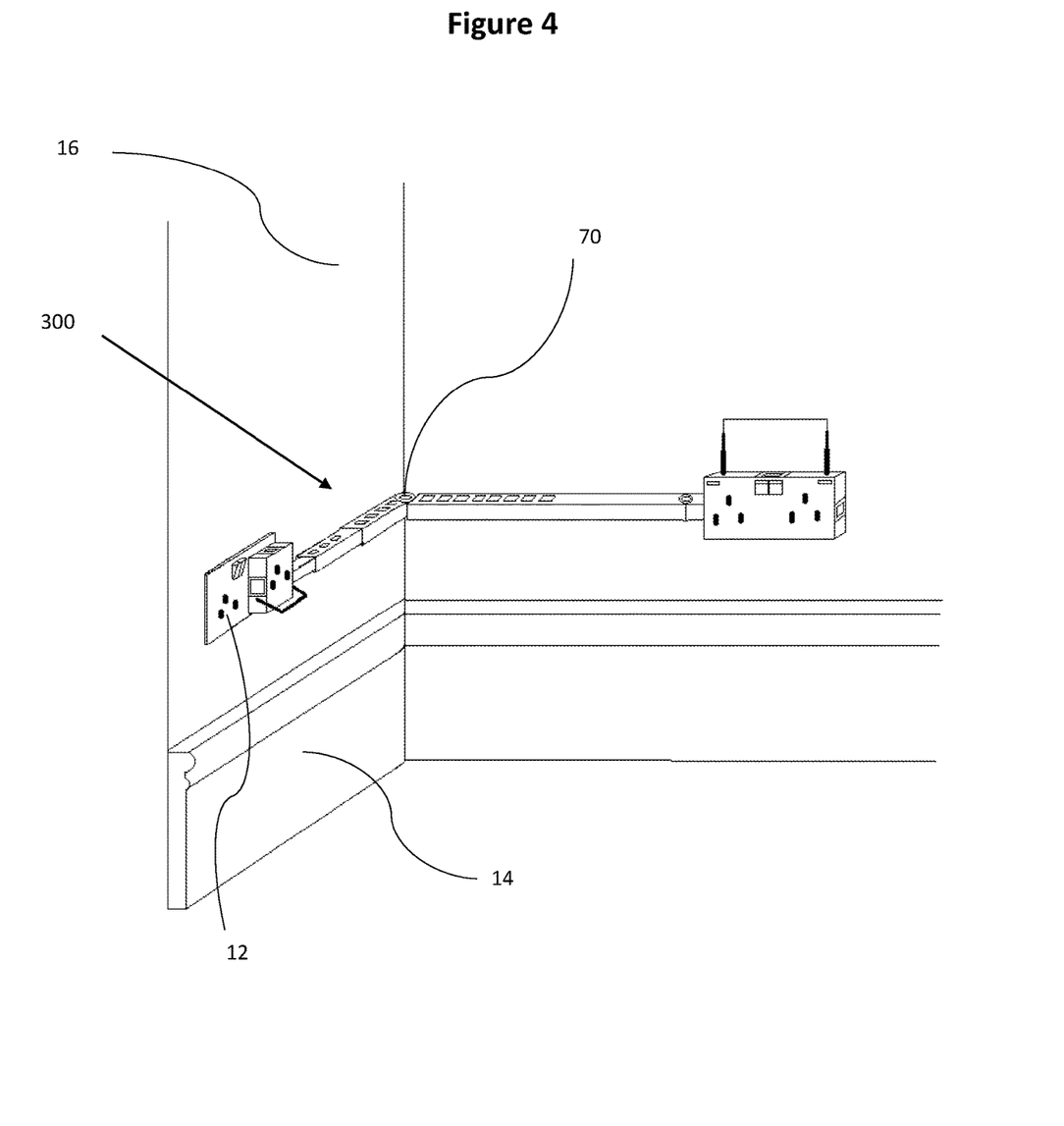
FIG. 4 is a perspective view of a third embodiment of an electrical socket extender extending around an interior corner of a room.

FIG. 4 shows a perspective view of a third embodiment of an electrical socket extender 300 in accordance with the present invention, here connected to a wall-mounted electrical socket 12 mounted near the floor, above a skirting board 14, the socket extender 300 extending horizontally along the wall 16 and around an interior corner of a room. This arrangement is made possible by the presence of a pivoting joint 70 formed between sub-sections of the linkage 22. This embodiment could just as usefully be used to traverse around an exterior corner between two walls.

Figure 5:
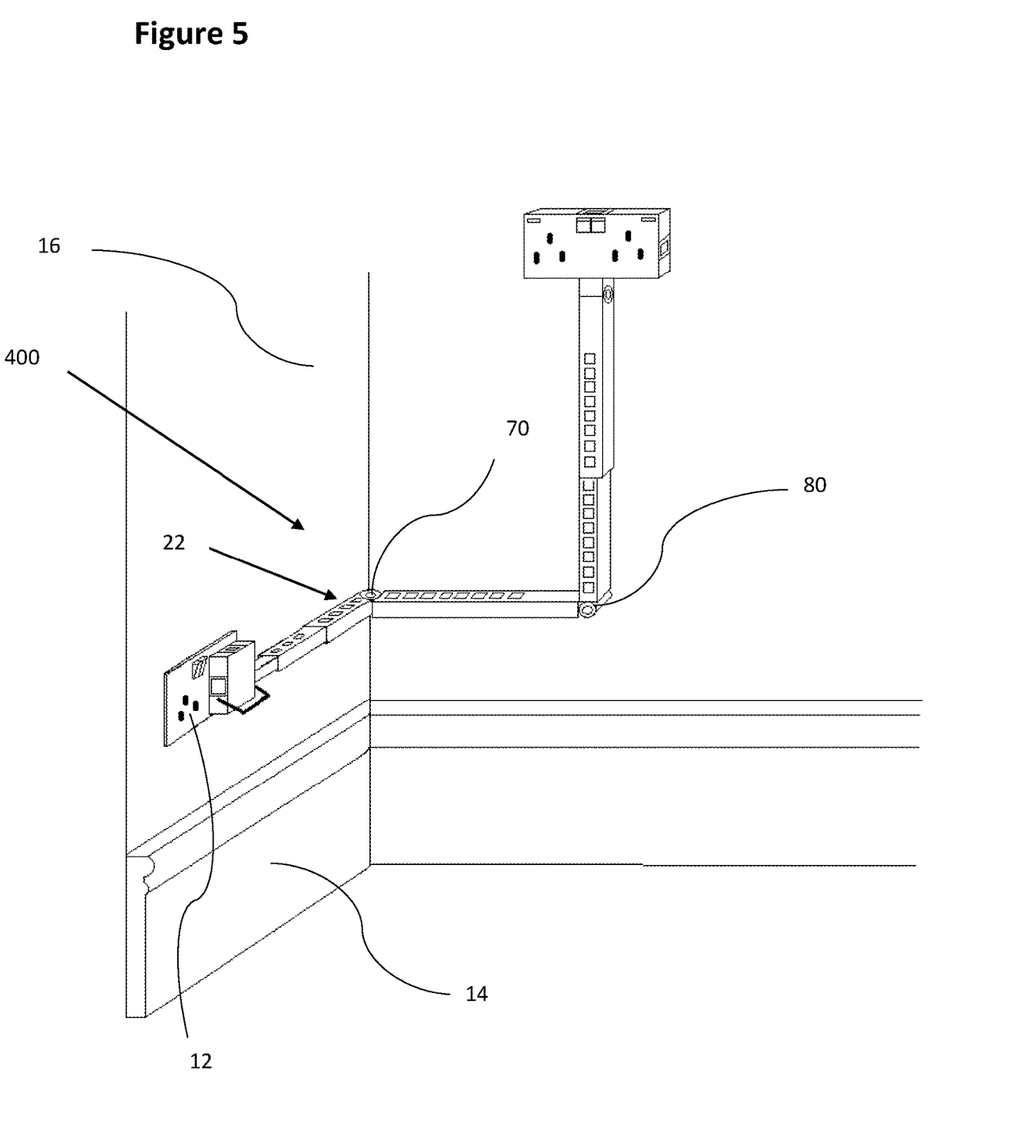
FIG. 5 is a perspective view of a fourth embodiment of an electrical socket extender extending horizontally around a corner and then vertically.

FIG. 5 shows a perspective view of a fourth embodiment of an electrical socket extender 400 in accordance with the present invention, here connected to a wall-mounted electrical socket 12 mounted near the floor, above a skirting board 14, the socket extender 400 extending first horizontally along the wall 16, then around an interior corner of a room by way of a first joint 70 and then vertically up a second wall. This embodiment is similar to that of FIG. 4, except that a second joint 80, with an axis of rotation rotated 90 degrees relative to the joint 70, is formed along the length of the linkage 22 which allows the electrical socket extender 400 to extend further up the second wall, above the height of the wall-mounted electrical socket 12.

Figure 6:
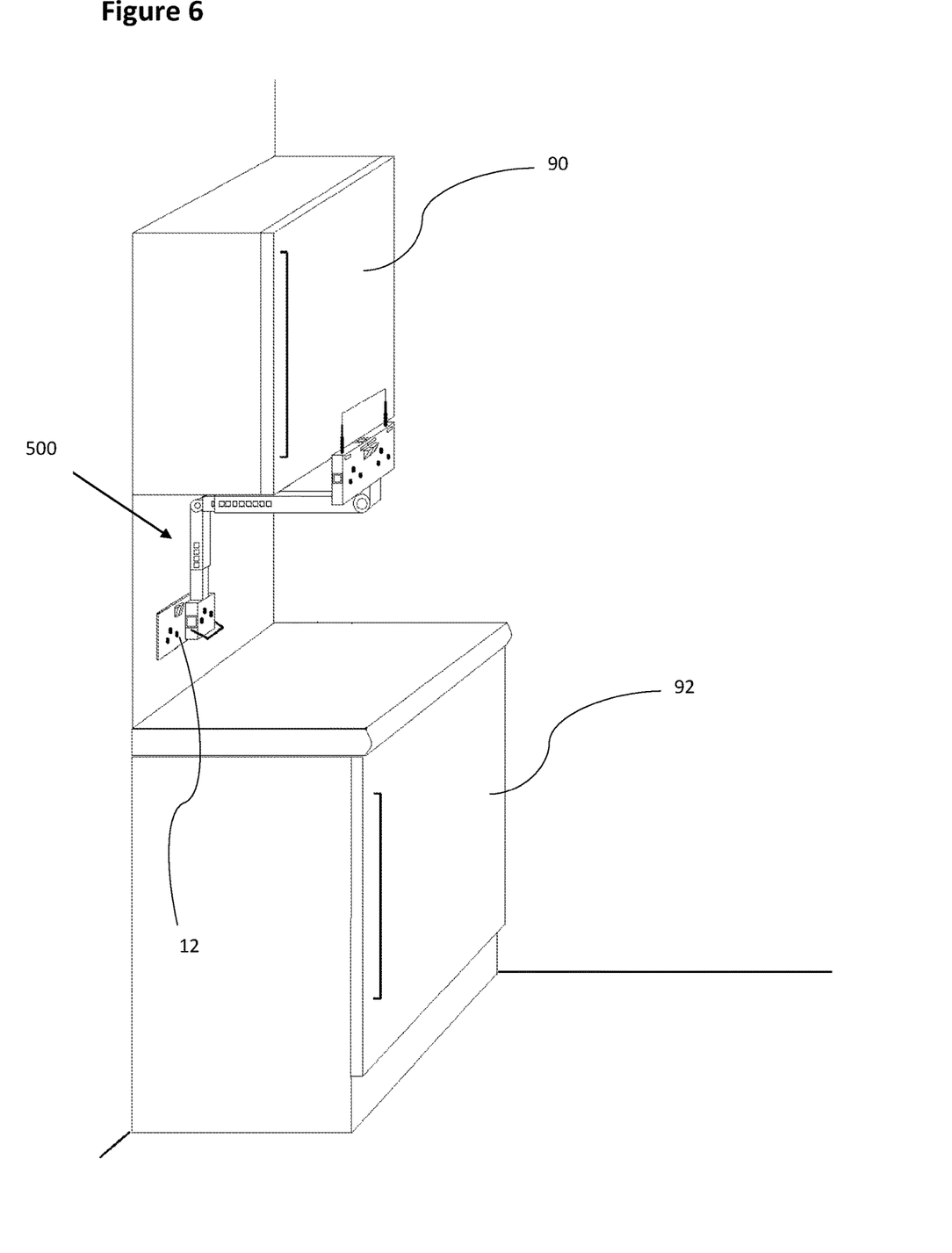
FIG. 6 is a perspective view of a fifth embodiment of electrical socket extender extending vertically upwards in front of an upper cupboard.

FIG. 6 shows a perspective view of a fifth embodiment of an electrical socket extender 500 in accordance with the present invention, here connected to a wall-mounted electrical socket 12 mounted around the midpoint of a wall between two wall-mounted cupboards. The socket extender 500 first extends vertically up the wall, then out from the wall underneath the upper cupboard 90, then vertically upwards in front of the upper cupboard 90. This arrangement could be useful if the workspace above the lower cupboard 92 must be kept free from appliance plugs and their wiring. It will be appreciated that other suitable arrangements are also possible.

Figure 7:
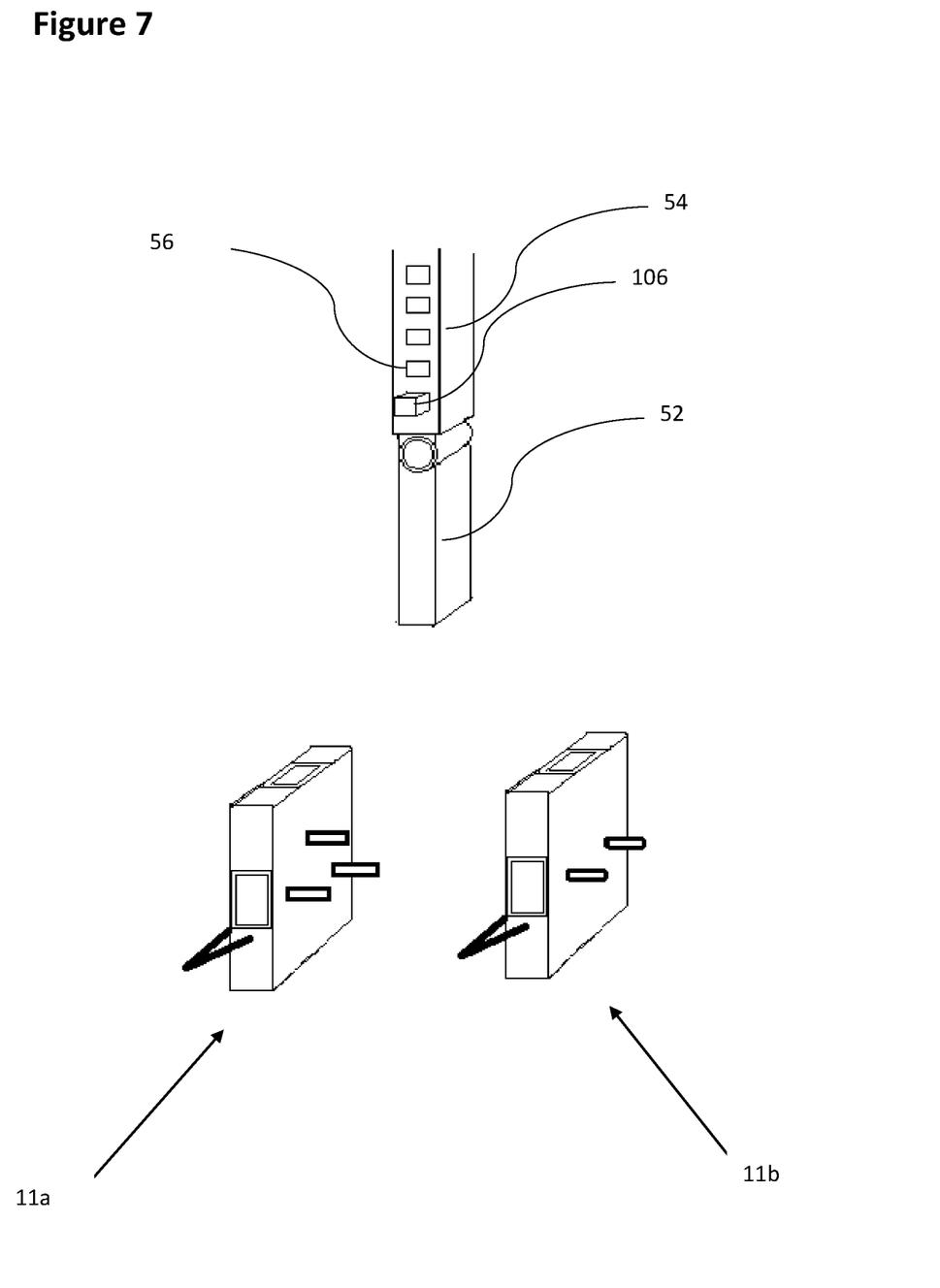
FIG. 7 is a perspective view of parts of an electrical socket extender.

FIG. 7 shows a perspective detail view, of a part of an electrical socket extender in accordance with the present invention, wherein the socket engaging portion, generally indicated 11a and 11b, is interchangeable to accommodate wall-mounted electrical sockets of different configurations, and two possible distinct interchangeable versions are illustrated; a three-pronged version 11a and a two-pronged version 11b. Existing (conventional) electrical plugs can be used. The cooperating shapes of the cuboidal locking formation 106 and square openings 56 formed on the surface of the exterior telescopic section 54 are also easily identifiable. Depressing the locking formation 106 permits the exterior telescopic section 54 to slide relative to the interior telescopic section 52, until an opening 56 is directly above the locking formation 106, whereupon the locking formation pops up through an opening 56, under action of a spring, and secures the exterior telescopic section 54 relative to the interior telescopic section 56.

Figure 8:
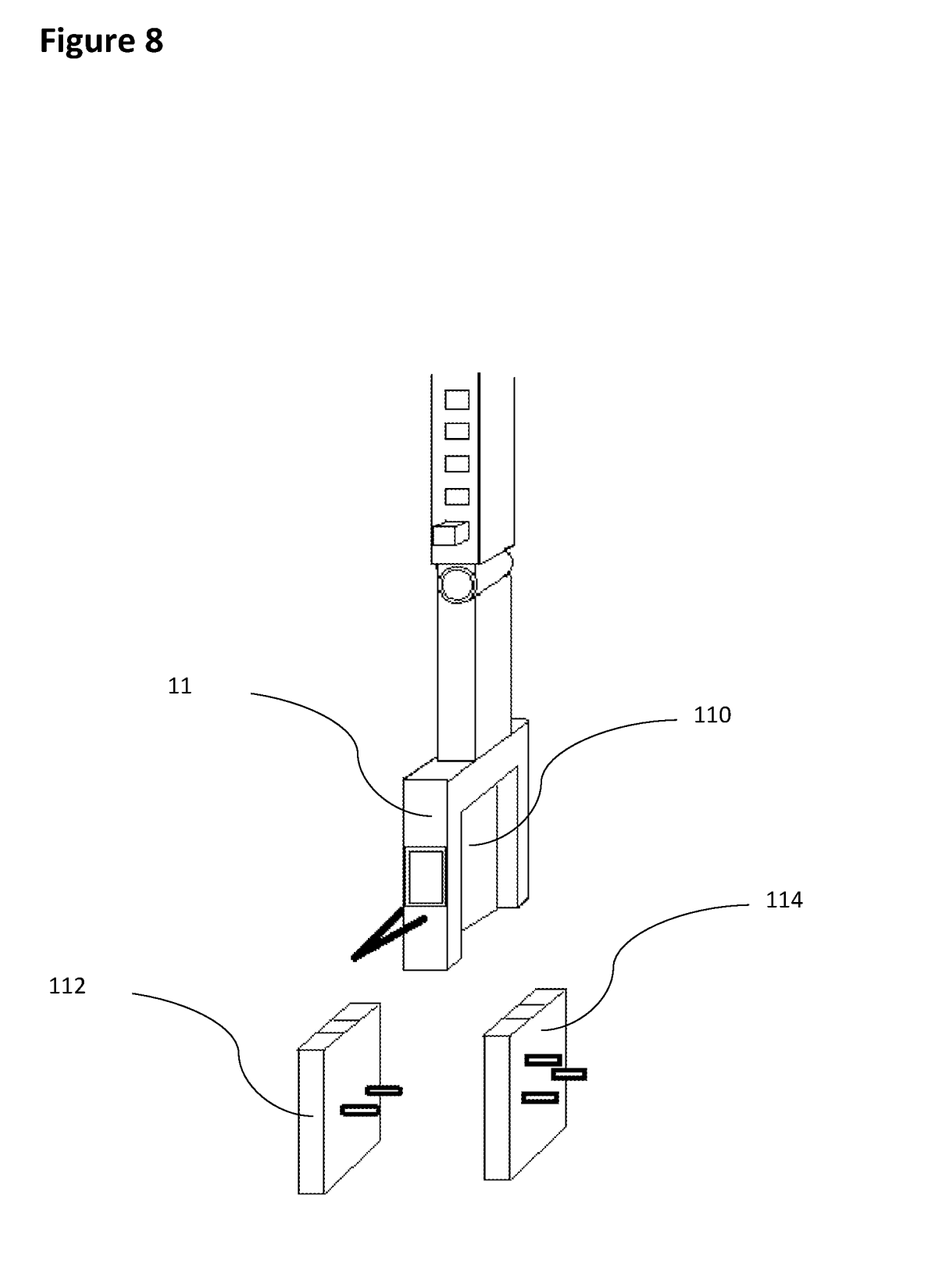
FIG. 8 is a perspective view of a part of an electrical socket extender, wherein the socket engaging portion has interchangeable parts to accommodate wall-mounted electrical sockets of different configurations.

FIG. 8 shows a perspective detail view of a part of an electrical socket extender, in accordance with the present invention, wherein a region of the socket engaging portion 11, is interchangeable to accommodate wall-mounted electrical sockets of different configurations. Two possible distinct interchangeable parts with the electrically conductive prongs are illustrated; a two-pronged version 112 and a three-pronged version 114. Either of these may be slid into a recess 110 on the socket engaging portion 11 to engage and electrically couple thereto.

Figure 9A:
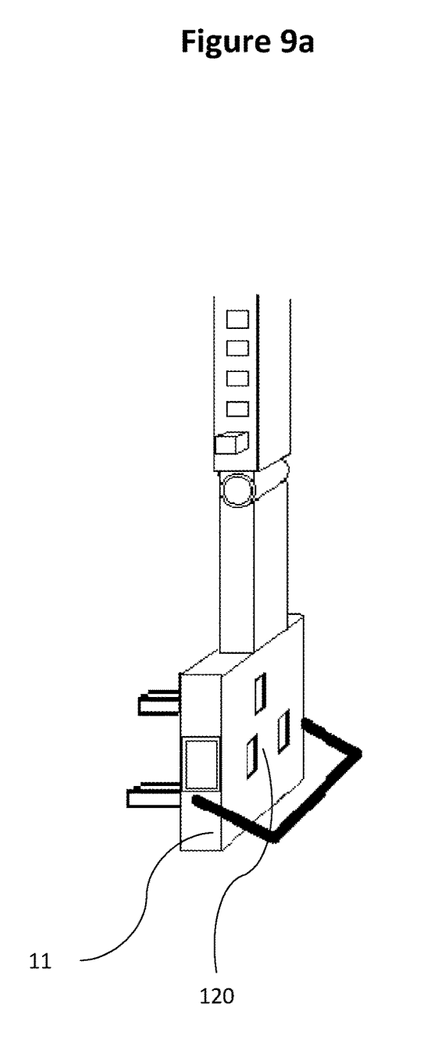
FIG. 9a is a perspective view of a part of an electrical socket extender.

FIG. 9a shows a perspective detail view of a part of an electrical socket extender, in accordance with the present invention, wherein the socket engaging portion 11 comprises an electrical appliance socket 120 into which an appliance plug may be introduced.

Figure 9B:
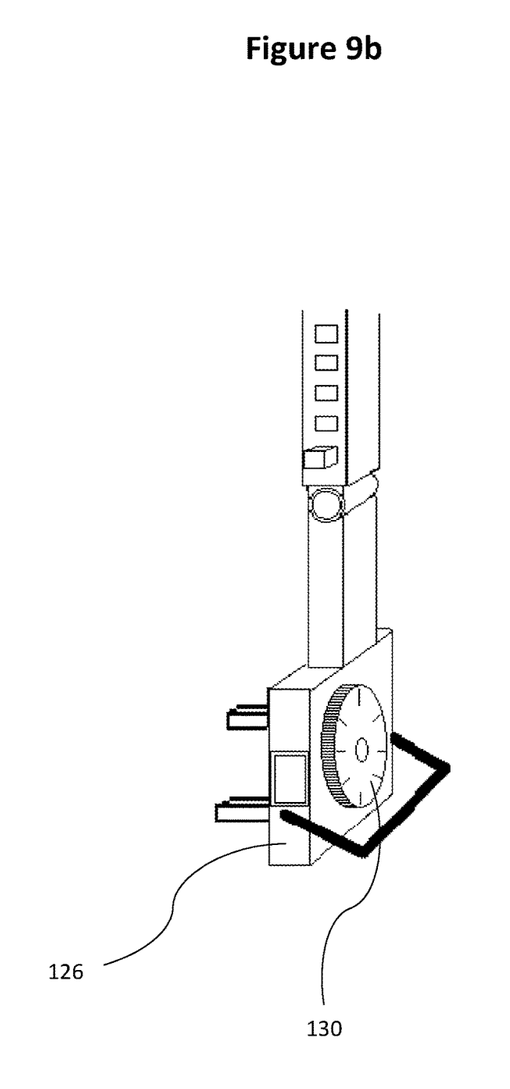
FIG. 9b is a similar perspective view wherein the socket engaging portion includes a timer.

FIG. 9b shows a similar perspective detail view of a part of an electrical socket extender, in accordance with the present invention, with a different embodiment of socket engaging portion 126 which comprises a timer 130 to control the supply of electricity from the wall-mounted electrical socket (not shown) to any appliances connected to the electrical socket extender (not shown in this view).

Figure 10:
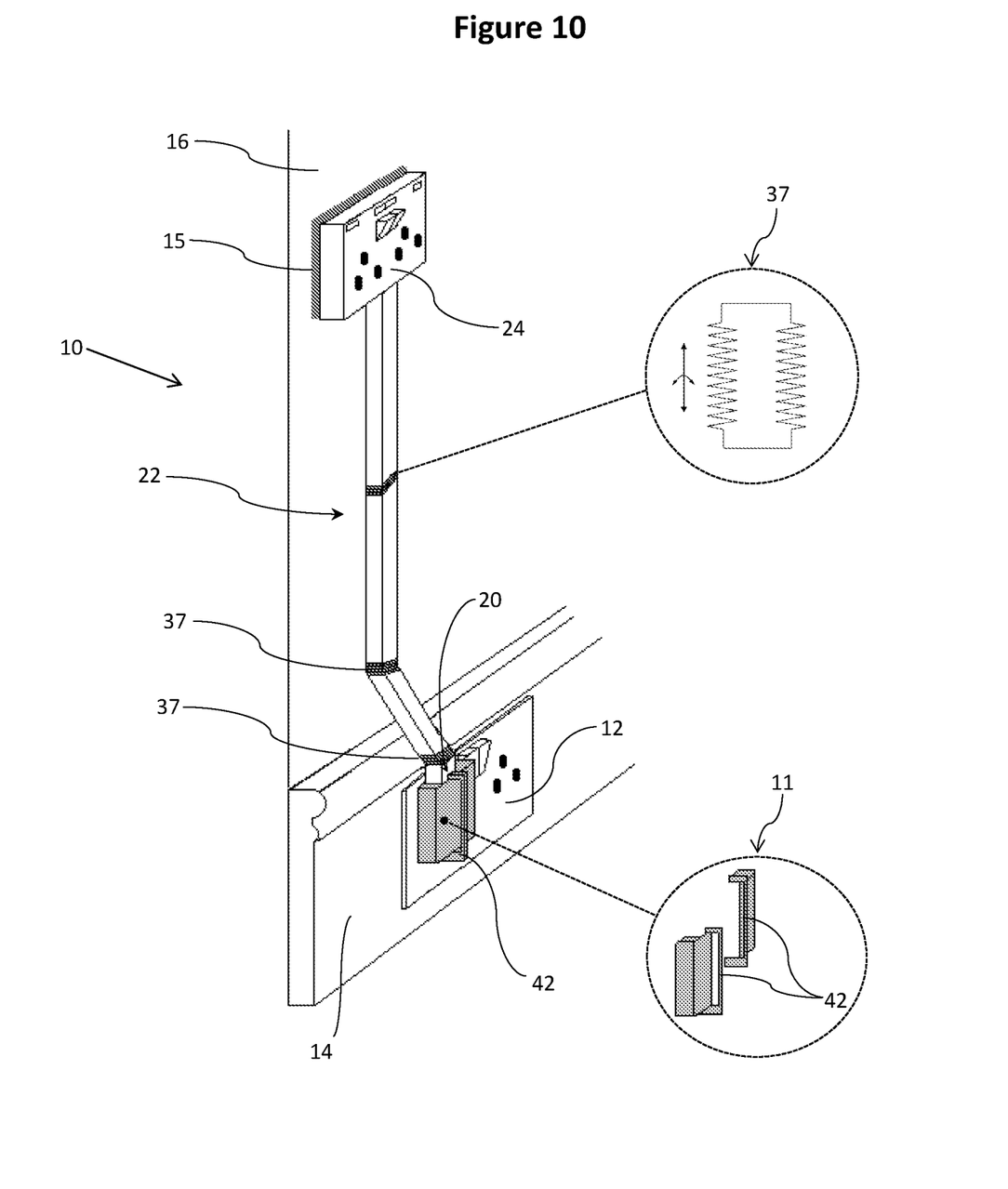
FIG. 10 is a perspective view of a sixth embodiment of an electrical socket extender connected to a wall-mounted electrical socket.

FIG. 10 shows a perspective view of a sixth embodiment of the electrical socket extender in accordance with the present invention. The features and advantages described in the above embodiments generally apply in this latter embodiment.

FIG. 10 shows a socket extender 10 that extends upwardly on/over a wall 16. The electrical socket extender 10 has a socket engaging portion 11 which is connected to a wall-mounted electrical socket 12 that is mounted, for example, upon a skirting board 14, located at the base of the wall 16.

The sixth embodiment mainly differs from the embodiment of FIG. 1 in that the three joints 37 (formed along the length of the linkage 22 between sub-sections thereof) are formed as resiliently deformable accordion or concertina types of joints/members, as shown in the enlarged side view of FIG. 10. The provision of accordion/concertina joints/members 37 enables the sub-sections of the linkage 22 to flex in all directions relative to each other. As a result, the sub-sections can bend sideways relative to each other to allow the socket extender to collapse conveniently and easily or conform to underlying wall shapes or external structures. It will be readily evident that this arrangement allows enhanced adjustability and flexibility whilst also providing improved portability and storage.

It will be also readily evident that the arrangement shown in FIG. 10 is similar to the arrangement shown in FIG. 8. In fact, in the former example the socket engaging portion 11 forms a cover that is designed to enclose/frame a conventional plug element having conductive prongs. Such a cover may either slide into, or clipped to, the plug element, for example, to the sides of the plug. It may also be permanently secured to the plug, for example, by adhesive means. The cover may be formed by one or more pieces which are pre-assembled or integrated with a plug element.

The cover may have a handle 42 to facilitate pulling of the plug from the wall-mounted socket. FIG. 10 shows a two-piece cover in which each piece comprises a portion of the handle 42 that is hollow-shaped such that when the pieces are assembled together and secured to the plug the electric cable (extending out of the plug) is fully enclosed in the handle to thereby forming an electrical connection with the linkage via the primary coupling formation 20 (that is formed in the socked engaging portion 11). The cover could also be designed such that the electric cable is partially enclosed in the handle, or runs fully or partially inside the cover.

In this embodiment, the handle 42 has a first end that is connected to the output electrical port of the plug and a second end that is connected to the linkage to enable the electric cable extending out of the plug to be channeled to the appliance socket section inside the handle hollowed section and the linkage. In this example the handle is oriented upwardly towards (and substantially aligned with) the linkage.

FIG. 10 also shows a docking plate 15 that is secured to the wall/surface 16 by various securing means as indicated above. The docking plate is configured to allow an appliance socket section 24 to conveniently clip and unclip thereon to thereby improving the stability of the extender whilst also improving safety.

It will be understood that any features described in relation to any particular embodiment may be featured in combination with other embodiments.

The invention claimed is:

1. An electrical socket extender to provide an electrical socket remote from a wall-mounted electrical socket, the socket extender comprising:
a socket engaging portion connectable to the wall-mounted electrical socket and comprising:
a non-conductive housing having at least one electrically conductive prong for insertion into a female recess of the wall-mounted electrical socket to electrically couple thereto; and
one or more secure primary coupling formation formed about a periphery of the socket engaging portion such that, when the socket engaging portion is engaged with a wall-mounted electrical socket one or more of the or each primary coupling formation may releasably connect to a linkage to form an electrical connection therewith;
an appliance socket section providing one or more electrical appliance socket and comprising:
a body having at least one electrically conductive recess formed therein, the recess allowing insertion of an electrically conductive prong of an electrical appliance plug; and
one or more secure secondary coupling formation formed about a periphery of the appliance socket section, one or more of the or each secondary coupling formation releasably connectable to the linkage and the or each secondary coupling formation having an electrical connection, interior to the body, to electrically-couple the linkage to the electrical appliance socket; and
the linkage, which connects the appliance socket section to the socket engaging portion, comprising:
an elongate and electrically insulated body having a first end releasably connectable to any primary coupling formation, a second end connectable to any secondary coupling formation; and
a conducting arrangement extending the length of the body, between the first end and the second end to electrically couple the socket engaging portion to the appliance socket section,
wherein the first end of the linkage is connected to the socket engaging portion and the second end of the linkage is connected to the appliance socket section such that the linkage extends from the socket engaging portion over the wall,
wherein each of the appliance socket section and the socket engaging portion has a handle, and
wherein each handle is movable between a use position and a storage position.

2. An electrical socket extender as claimed in claim 1, wherein the linkage is extendable.

3. An electrical socket extender as claimed in claim 1, wherein the linkage comprises a telescopic arrangement to permit extension thereof.

4. An electrical socket extender as claimed in claim 3, wherein the telescopic arrangement comprises a releasable locking means to secure the telescopic arrangement at various positions along a range of linear extended positions.

5. An electrical socket extender as claimed in claim 1, wherein the linkage includes at least one joint either formed along the length of the linkage between sub-sections thereof or at either end of the linkage.

6. An electrical socket extender as claimed in claim 5, wherein the linkage comprises at least one joint stabiliser, selectively engageable to prevent articulation of the at least one joint.

7. An electrical socket extender as claimed in claim 1, wherein the linkage comprises at least one swivel formed along the length of the linkage or at either end of the linkage.

8. An electrical socket extender as claimed in claim 7, wherein the linkage comprises at least one swivel lock to prevent movement of parts relative to the at least one swivel.

9. An electrical socket extender as claimed in claim 4, wherein the locking means may be selectively disengaged by a release mechanism to enable the linkage to be further extended or retracted.

10. An electrical socket extender as claimed in claim 1, wherein the linkage comprises means to enable two or more of such linkages to be connected to one another between the socket engaging portion and the appliance socket section, to extend the reach of the electrical socket extender and/or change direction/orientation.

11. An electrical socket extender as claimed in claim 10, wherein the linkage includes one or more accordion/concertina elements either formed along the length of the linkage between sub-sections thereof or at either end of the linkage, wherein the one or more accordion/concertina joints allow the linkage or the sub-sections to flex in all directions, including bend sideways, relative to each other.

12. An electrical socket extender as claimed in claim 1, wherein the linkage and/or appliance socket section comprises connecting means to connect the linkage and/or appliance socket section to the wall.

13. An electrical socket extender as claimed in claim 12, wherein the appliance socket section is attached, preferably by clipping means, to a docking plate that is secured to the wall to thereby supporting the appliance socket section in its position remote from the wall-mounted electrical socket.

14. An electrical socket extender as claimed in claim 1, wherein the socket engaging portion is interchangeable with differently configured socket engaging portions to accommodate wall-mounted electrical sockets of different configurations and the appliance socket section is independently interchangeable to accommodate electrical appliance plugs of differing number or configuration, including existing conventional electric plug elements.

15. An electrical socket extender as claimed in claim 1, wherein the housing is formed by a cover and a plug element having conducting prongs, the plug element being attached to the cover.

16. An electrical socket extender as claimed in claim 15, wherein the cover comprises one or more pieces which are pre-assembled or integrated with the plug element, preferably wherein the one or more pieces are secured to the plug by clipping means.

17. An electrical socket extender as claimed in claim 1, wherein a cover comprises a handle that is configured to electrically couple the socket engaging portion with the linkage.

18. An electrical socket extender as claimed in claim 1, wherein the elongate and electrically insulated body is formed by one accordion/concertina element or a plurality of articulated sub-sections, preferably interconnected by accordion/concertina elements.

19. An electrical socket extender to provide an electrical socket remote from a wall-mounted electrical socket, the socket extender comprising:
a socket engaging portion connectable to the wall-mounted electrical socket and comprising:
a non-conductive housing having at least one electrically conductive prong for insertion into a female recess of the wall-mounted electrical socket to electrically couple thereto; and
two or more secure primary coupling formations formed about a periphery of the socket engaging portion such that, when the socket engaging portion is engaged with a wall-mounted electrical socket each primary coupling formation may releasably connect to a linkage to form an electrical connection therewith;
an appliance socket section providing one or more electrical appliance socket and comprising:
a body having at least one electrically conductive recess formed therein, the recess allowing insertion of an electrically conductive prong of an electrical appliance plug; and
two or more secure secondary coupling formations formed about a periphery of the appliance socket section, each secondary coupling formation releasably connectable to the linkage and each secondary coupling formation having an electrical connection, interior to the body, to electrically-couple the linkage to the electrical appliance socket; and
the linkage, which connects the appliance socket section to the socket engaging portion, comprising:
a substantially rigid, elongate and electrically insulated body having a first end releasably connectable to any of the primary coupling formations, a second end connectable to any of the secondary coupling formations; and
a conducting arrangement extending the length of the body, between the first end and the second end to electrically couple the socket engaging portion to the appliance socket section,
wherein the first end of the linkage is connected to the socket engaging portion and the second end of the linkage is connected to the appliance socket section such that the linkage extends from the socket engaging portion over the wall and the appliance socket section is supported in its position remote from the wall-mounted electrical socket by the linkage,
wherein each of the appliance socket section and the socket engaging portion has a handle, and
wherein each handle is movable between a use position and a storage position.

* * * * *